(12) United States Patent
Hukkanen

(10) Patent No.: US 10,793,205 B2
(45) Date of Patent: Oct. 6, 2020

(54) ASSEMBLY AND METHOD FOR ENABLING ROTATIONAL MOTION IN A VEHICLE OR MOBILE WORKING MACHINE

(71) Applicant: Ponsse Oyj, Vieremä (FI)

(72) Inventor: Pentti Hukkanen, Vieremä (FI)

(73) Assignee: PONSSE OYJ, Wieremä (FI)

( * ) Notice: Subject to any disclaimer, the term of this patent is extended or adjusted under 35 U.S.C. 154(b) by 38 days.

(21) Appl. No.: 16/323,983

(22) PCT Filed: Aug. 30, 2017

(86) PCT No.: PCT/FI2017/050612
§ 371 (c)(1),
(2) Date: Feb. 7, 2019

(87) PCT Pub. No.: WO2018/042081
PCT Pub. Date: Mar. 8, 2018

(65) Prior Publication Data
US 2019/0210665 A1    Jul. 11, 2019

(30) Foreign Application Priority Data

Aug. 31, 2016   (FI) ..................... 20165648

(51) Int. Cl.
*B62D 33/10*   (2006.01)
*B62D 33/077*  (2006.01)
(Continued)

(52) U.S. Cl.
CPC ............. *B62D 33/10* (2013.01); *A01G 23/00* (2013.01); *B62D 21/18* (2013.01); *B62D 21/20* (2013.01); *B62D 33/077* (2013.01)

(58) Field of Classification Search
CPC ........ B62D 33/10; B62D 21/18; B62D 21/20; B62D 33/077; B62D 53/02; A01G 23/00
See application file for complete search history.

(56) References Cited

U.S. PATENT DOCUMENTS 3,160,284 A     12/1964 Moore
3,414,072 A *   12/1968 Hodges, Jr. ............ B62D 59/04
                                                 180/24
(Continued)

FOREIGN PATENT DOCUMENTS

EP    0830975 A1    3/1998
EP    0 960 799 A1  12/1999
EP    0960800 A2    12/1999

OTHER PUBLICATIONS

International Search Report (PCT/ISA/210) and Written Opinion (PCT/ISA/237) dated Dec. 5, 2017, by the Finnish Patent Office as the International Searching Authority for International Application No. PCT/FI2017/050612.
(Continued)

*Primary Examiner* — Darlene P Condra
(74) *Attorney, Agent, or Firm* — Buchanan Ingersoll & Rooney PC

(57) ABSTRACT

An assembly for enabling rotational motion in a vehicle or mobile working machine is disclosed which includes at least two sections arranged in an overlying position relative to the vehicle's or working machine's working surface. A top section can be led to motion relative to a bottom section and a longitudinal rotation axis, the top section and the bottom section being movably coupled to each other by at least one trajectory element which generates a curvilinear trajectory. The relative motion of the top section and the bottom section proceeds along a curvilinear trajectory in a section plane which is perpendicular relative to the lengthwise rotation axis. The trajectory can be at least partly in the shape of a circular arc, the midpoint of this curvilinear trajectory being disposed below the bottom section. An actuator mounted on the vehicle or working machine affects the top section and/or the bottom section.

21 Claims, 8 Drawing Sheets

(51) Int. Cl.
*B62D 21/18* (2006.01)
*A01G 23/00* (2006.01)
*B62D 21/20* (2006.01)

(56) References Cited

U.S. PATENT DOCUMENTS

| | | | |
|---|---|---|---|
| 4,679,803 A | 7/1987 | Biller et al. | |
| 6,027,173 A | 2/2000 | Bettini | |
| 6,155,776 A * | 12/2000 | Moyna | B60P 1/006 |
| | | | 414/513 |
| 7,040,428 B2 | 5/2006 | Arola et al. | |
| 7,753,382 B2 * | 7/2010 | Choi | E02F 9/028 |
| | | | 280/6.153 |
| 7,832,740 B2 * | 11/2010 | Kim | E02F 9/028 |
| | | | 180/89.15 |
| 9,738,321 B2 * | 8/2017 | Hukkanen | B60P 3/41 |
| 2003/0047367 A1 | 3/2003 | Vaile | |
| 2007/0012534 A1 * | 1/2007 | Murphy | E01F 15/148 |
| | | | 188/377 |
| 2009/0205908 A1 * | 8/2009 | Hammonds | B64F 1/22 |
| | | | 187/222 |
| 2015/0151952 A1 | 6/2015 | Kivi et al. | |

OTHER PUBLICATIONS

Search Report dated Feb. 16, 2017, by the Finnish Patent Office for Application No. 20165648.

The extended European Search Report dated Mar. 12, 2020, by the European Patent Office in corresponding European Application No. 17845593.7. (5 pages).

* cited by examiner

ASSEMBLY AND METHOD FOR ENABLING ROTATIONAL MOTION IN A VEHICLE OR MOBILE WORKING MACHINE

BACKGROUND OF THE INVENTION

The present invention relates to an assembly as set forth in the preamble of claim 1 for enabling rotational motion in a vehicle or mobile working machine.

The present invention relates also to a method as set forth in the preamble of claim 19 for enabling rotational motion in a vehicle or mobile working machine.

Various mobile vehicles and working machines are often forced to perform multiple operations on uneven grounds as well as on sloping surfaces, it being important that the motion elements such as the wheels and/or tracks of a vehicle or working machine make adequate contact with the ground. A good contact with the ground or other working surface ensures for example an advancement or drive capability for the vehicle, as well as a good traction between the working surface and the vehicle or working machine. It also enables a low surface pressure on the working surface and a good stability. Features such as these are particularly pronounced in vehicles and working machines intended for off-road service.

The foregoing features can be improved for example by allowing relative rotation for axles, axle assemblies, or, especially in the case of frame-steered or wheel-steered working machines, for articulated frame sections.

One significant application for such a solution is a stabilization system for example for steadying the lateral wobble of a frame-steered vehicle's cargo space. One group of such vehicles is found in forest machines, wherein the transported load is often subjected to plenty of the working machine's varying fluctuations. As a result of such fluctuations, the stability of a working machine is compromised. In the case of a forest machine, and especially a forwarder, it is prior knowledge that the most adverse movements are those transverse to the longitudinal axis of such a machine, so-called lateral sway motions. A typical source of lateral swaying is one side wheel, track, or one bogie tire running over a high obstacle, such as a boulder or a stump, or respectively the tire crossing a hole. These fluctuations are the more severe, the rougher the terrain and the higher the speed of a moving vehicle.

The fluctuations of a vehicle or a mobile working machine affect not only its stability but also for example its terrain friendliness or off-road handling. By dampening the fluctuations the driving speed can be increased, an aspect that has a major impact on productivity.

The foregoing drawbacks have conventionally been addressed by replacing a two-wheel axle with a special rocker bogie axle, which by virtue of a levering effect between the wheels stabilizes to some degree the fluctuations of a vehicle and working machine as a result of the rocker bogie's tendency to halve the fluctuation caused by each obstacle.

In addition to the rocker bogie axle, attempts have been made to work out the foregoing drawbacks by obtaining, in a dual frame machine, support for a frame, which is wobbly because of the uneven ground and thus in need of support, from a second, support-providing frame. Such a solution stabilizes the working machine by distributing the load between the frames. Such a solution only works in a limited manner when there is a significant mass discrepancy between the frames. Thus, the lighter frame is not in all cases capable of steadying the fluctuations of the heavier frame.

BRIEF DESCRIPTION OF THE INVENTION

It is therefore an objective of the invention to provide an assembly and a method whereby the foregoing problems could be at least mostly obviated. This objective is attained by providing the assembly and method for enabling rotational motion in a vehicle or mobile working machine with characterizing features according to this invention as defined in the claims.

In particular, the present problems are solvable by combining the characterizing features as set forth in the characterizing clauses of claims 1 and 19.

Preferred embodiments of the invention are presented as objects of the dependent claims.

In the process of enabling the rotational motion of a frame section, such as a cab or a cargo space or some other payload, provided in a vehicle or mobile working machine above the motion elements, with respect to at least a bottom frame section, preferably also with respect to a main frame associated with the motion elements, it is preferable that the rotation axis of such a section be provided as close as possible to the vehicle's or working machine's operating surface, for example the ground. Thereby, also the strength of lateral fluctuations otherwise generated in a vehicle or working machine can be minimized. In other words, it is possible to dampen, or even completely eliminate, the rotation or fluctuation applied to this top frame section, even if the mass to be dampened or stabilized should have its center of gravity at a high position with respect to the working surface.

Since the invention enables a minimization of lateral fluctuations regarding the cab or cargo space or other payload, the loads applied to the frame structure and other cargo space or other payload supporting members of a vehicle or working machine are also substantially reducible. At the same time, it is also possible to reduce the major loads otherwise generated particularly by the stabilization of a cargo space.

This has been worked out in the present invention by having a so-called top section provided in the vehicle or working machine adapted to move along a substantially curvilinear path with respect to a bottom section, preferably also with respect to a main frame associated with the motion elements. The bottom section comprises at least motion elements for enabling a movement of the vehicle or working machine. The curvilinear path is at least over part of its length in the shape of a circular arc, preferably the path can be circular arc shaped over its entire extent. On the other hand, the curvilinear path may vary in terms of its curvature as well as change in the direction of its curvature. In a preferred case, the curvilinear path is curving around the lengthwise direction of a vehicle. When the solution is applied to a frame-steered or wheel-steered vehicle or working machine, the steering pivot of a frame-steered vehicle and a bogie or caterpillar track axle mounted rigidly on the main frame or a two-wheel axle are further connected by the main frame in a prior known fashion. Hence, the stresses are transmitted from the steering pivot to a rigid bolt attachment of the bogie or caterpillar track axle or the two-wheel axle the same way as before. Thus there is no need for an intermediate heavy-duty bearing assembly of the type that would be otherwise required especially by a pendulum type bogie or caterpillar track axle or a two-wheel axle.

In a solution of the invention there is no need to separately articulate a rocker bogie to the vehicle's or working machine's frame which bears the loads resulting from terrain and power transmission. Neither is the rocker bogie needed for avoiding forces caused by the working machine turning or negotiating obstacles in the terrain. Accordingly, it has been possible with the present solution to mostly prevent the deadweight of a vehicle or working machine from increasing in the form of an articulated rocker bogie or the like. At the same time, it has been possible to keep its articulation mechanics as simple as possible, nor does the hydraulics or its control become substantially more complicated than before.

The simple mechanics of the present solution also enables the vehicle or working machine to be constructed in a modular fashion. By virtue of the invention, the vehicle can be constructed with conventional prior art structures. If desired, however, between the bottom section and the top section can be simply added motion elements of the invention, whereby lateral fluctuations of the top section and stabilizing functionality of the vehicle or working machine are more readily manageable than before.

Being able to utilize a bogie structure both in the front and rear frames of a vehicle or working machine the tire surface pressures become distributed more evenly than before over the working surface. Thus, damages to the terrain and root system otherwise caused for example by a forest machine will be reduced while moving on soft surface becomes easier. Respectively, it is possible to reduce a peak load applied to an individual half of the bogie or caterpillar track axle assembly or the two-wheel axle (the wheelset on the same side of a machine provided in a bogie or caterpillar track axle assembly or in a conventional axle) as the load is distributed more uniformly to all wheels of the machine.

When the present solution is applied to a forest machine, it is possible for example on a thinning worksite to use a high loaded cargo space and to drive even across a narrow roadway without damaging trees alongside the roadway. This is possible since the vehicle's frame, or a frame above the motion elements, in other words the top section, is maintainable in a substantially upright position, i.e. capable of being leveled more readily than before. As a result, it is possible to avoid damages otherwise caused by lateral fluctuations both to the surrounding timber, terrain, as well as forest floor and respectively to the vehicle or working machine.

Even though the present invention is primarily intended for holding the top section of a vehicle or working machine in its substantially upright position, the trajectory element of the invention lends itself also to manual control. This way, the top section can be for example steered and locked as necessary to a specific position in relation to the bottom section. Such situations may arise for example when working on a slope, or when the boom extended to a long configuration is used for lifting a major load, whereby, for a stabilizing purpose, the working machine can be set to lean in an opposite direction. On the other hand, the forwarder's cargo space can be tilted towards the working side, whereby for example the working side facing bolsters of a forest machine's cargo space, i.e. the boards of a cargo space, become steered to a lower position. Hence, the lifting requirement of a forest machine's loader boom head can be alleviated. In addition, the stresses on a vehicle's frame and axles will be reduced, thus demanding less maintenance and repair.

Other benefits afforded by the invention will be presented hereinafter while describing specific embodiments of the invention more precisely.

BRIEF DESCRIPTION OF THE FIGURES

A few preferred embodiments of the invention will now be described more closely with reference to the accompanying drawing, in which.

DETAILED DESCRIPTION OF THE PREFERRED EMBODIMENTS

Figure 1:
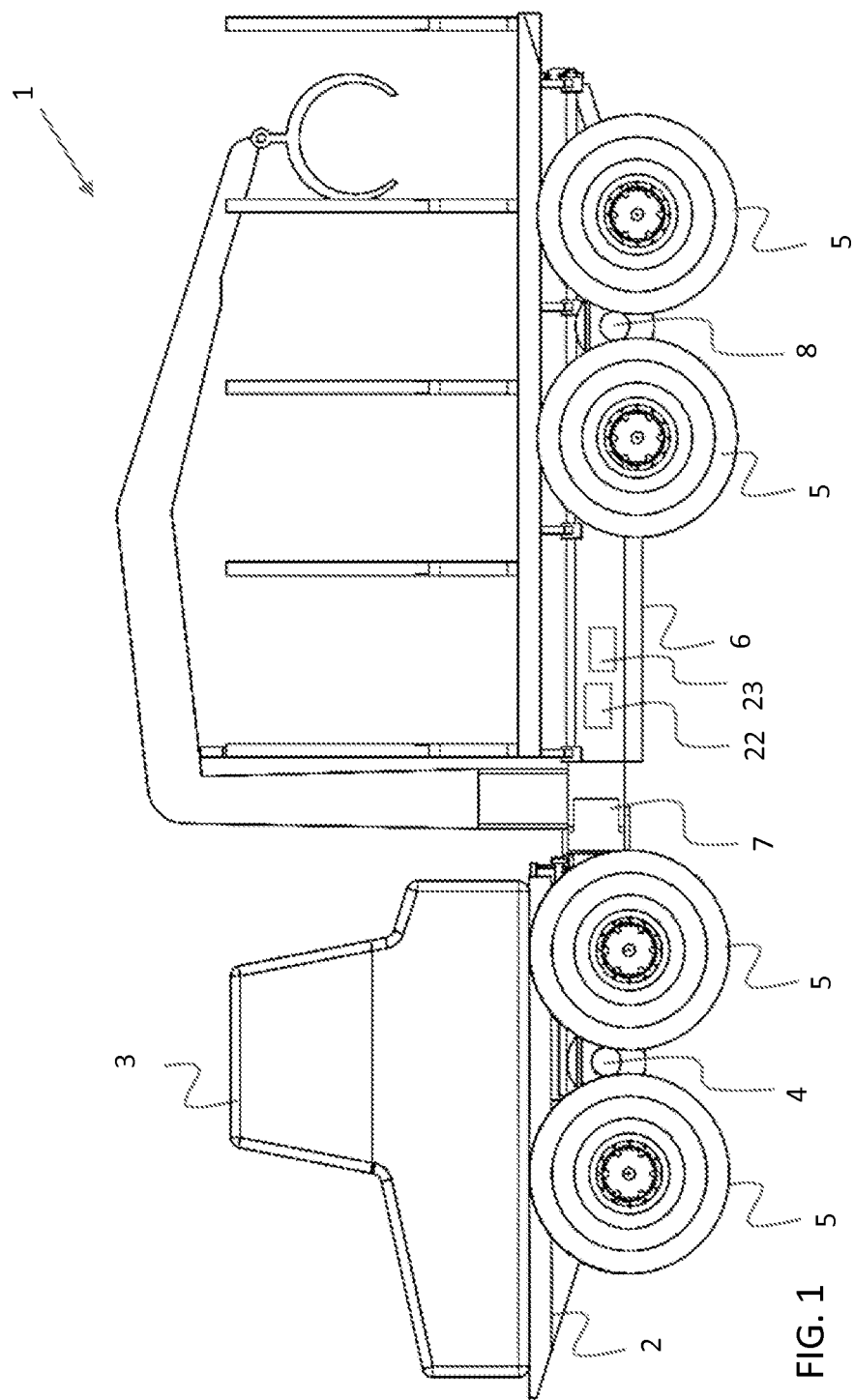
FIG. 1 shows a schematic axonometric view of fitting the forest machine with a present frame structure.

In the present figures, the assembly or method for enabling rotational motion in a vehicle or mobile working machine has not been presented in scale, but the figures are schematic, expressing the structure and operation of preferred embodiments in principle. Thus, the structural elements designated with reference numerals in the accompanying figures correspond to structural elements denoted with reference numerals in this specification.

In terms of its structure and operation, the present assembly will next be portrayed mostly in reference to forest machinery. Although the presented embodiment therefore comprises a frame-steered forest machine 1, the present assembly does not limit itself to just this operating environment but the assembly is also capable of being utilized in other vehicles or mobile working machines, both single- and multi-frame types, whether provided with frame steering or not. A few alternative solutions are indeed depicted in the appended FIGS. 2, 3, 4 and 5.

As can be inferred from FIG. 1, one embodiment of the present assembly comprises a forest machine 1, from which figure can be perceived a front section 2 and a cab 3 provided therein. The front section is provided with a bogie axle 4 extending to both sides thereof and provided in the illustrated embodiment with wheels constituting motion elements 5. Thus, these motion elements may consist of an axle with its wheels, a rocking axle with its wheels, a bogie axle with its wheels, a caterpillar track axle, or some other per se known element whereby the vehicle or working machine is led to motion with respect to its working surface. To the front section is connected a rear section 6 preferably by means of a frame pivot 7 with two degrees of freedom. The rear section is likewise provided with a bogie axle 8 extending to both sides thereof and also provided with wheels constituting second motion elements 5. The frame pivot 7, interconnecting the front and rear sections, allows, in a per se known manner, both a rotation of the front and rear sections with respect to a rotation axis substantially lengthwise of the vehicle (a swivel joint enabling adaptation to terrain features) and a rotation of the front and rear sections relative to each other with respect to a vertical axis extending through the pivot (a frame-steering joint).

Although the solution will be described next with reference specifically to a wheeled bogie axle, it is equally plausible to carry out the present assembly with an axle which is provided not with wheeled bogies but for example with caterpillar tracks on opposite sides of the frame. Such a bogie or caterpillar track axle assembly or a two-wheel axle assembly is preferably of a rocking type, but the presently disclosed functional notion can be equally well implemented also in a non-rocking bogie or caterpillar track axle assembly or a two-wheeled axle.

As shown on the other hand in FIG. 2, the present assembly may comprise just two sections, which are in at least a partially overlying position with respect to the working surface of a vehicle or working machine, and which provide the assembly with structures subsequently referred to as a top section 9 and a bottom section 10.

Figure 2:
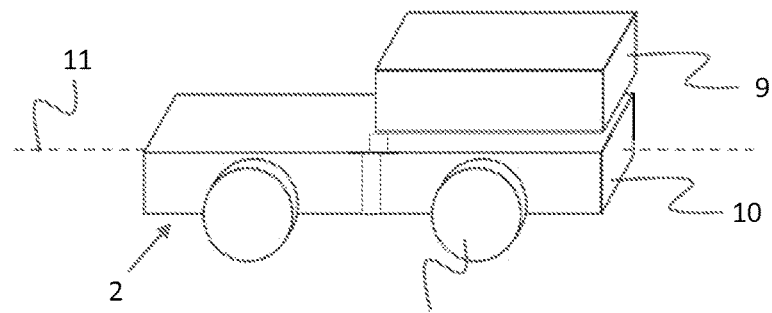
FIG. 2 shows a highly schematic view of a working machine with a bottom section and a top section connected to each other.

The embodiment of FIG. 2 has its bottom section comprising at least motion elements 5 which may include at least the following: a wheelset on axle, a bogie axle assembly with its tires, or a caterpillar track axle assembly with its tracks or chains.

Figure 3:
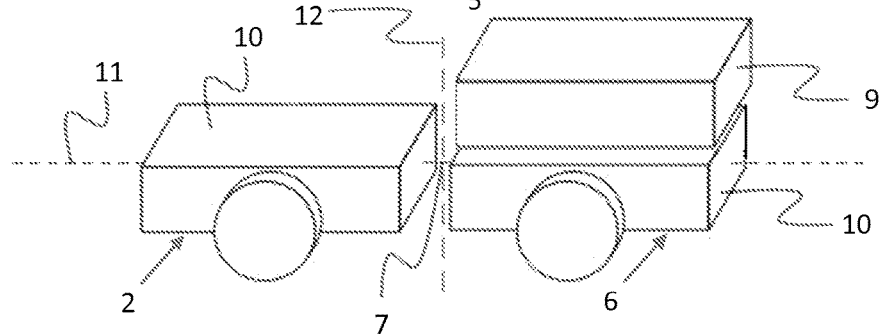
FIG. 3 shows a highly schematic view of a working machine with two bottom sections connected to each other with a frame pivot and one top section.

The embodiment of FIG. 3 can be perceived for example as a schematic representation of the working machine shown in FIG. 1. From the figure can be distinguished a front section 2 and a rear section 6 connected thereto. The sections are interconnected with a frame pivot 7 that has at least two degrees of freedom. This frame pivot allows a rotation of these interlinked front section and rear section with respect to a rotation axis 11 substantially lengthwise of the vehicle or working machine, as well as with respect to a vertical axis extending through the frame pivot. The sections constitute simultaneously two bottom sections 10 for the assembly. On top of one bottom section is a top section 9, which in a working machine embodiment can be a cab 3 as mentioned above, a loader operated by the working machine, or a cargo space for carrying a payload.

Figure 4:
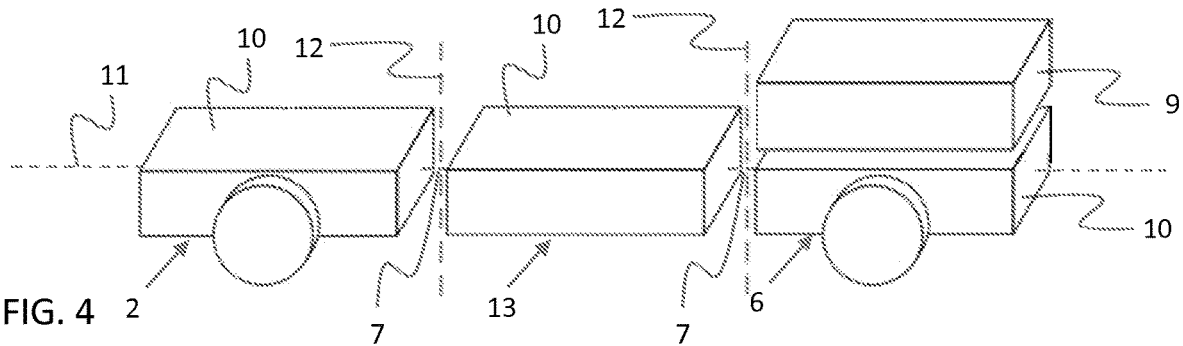
FIG. 4 shows a highly schematic view of a working machine with three bottom sections connected to each other with a frame pivot and one top section.

In FIG. 4 is in turn shown an embodiment, which includes a front section 2 and a rear section 6. Between these in the illustrated embodiment is fitted one middle section 13, but it is conceivable that there are several of these middle sections. The foregoing sections make up three bottom sections 10 for the assembly. The sections are interconnected with a frame pivot 7, such that at least one of these frame pivots comprises a joint with at least two degrees of freedom, allowing a rotation of the inter-articulated front section 2 and middle sections 13, middle section 13 and rear section 6 or two adjacent middle sections 13 with respect to a rotation axis 11 substantially lengthwise of the vehicle or working machine, as well as with respect to a vertical axis 12 extending through the frame pivot. On top of the bottom section 6, furthest to the right in the figure, is provided a top section 9 which in a working machine embodiment can be for example a cab as mentioned above, or a cargo space, or some other equivalent payload.

Figure 5:
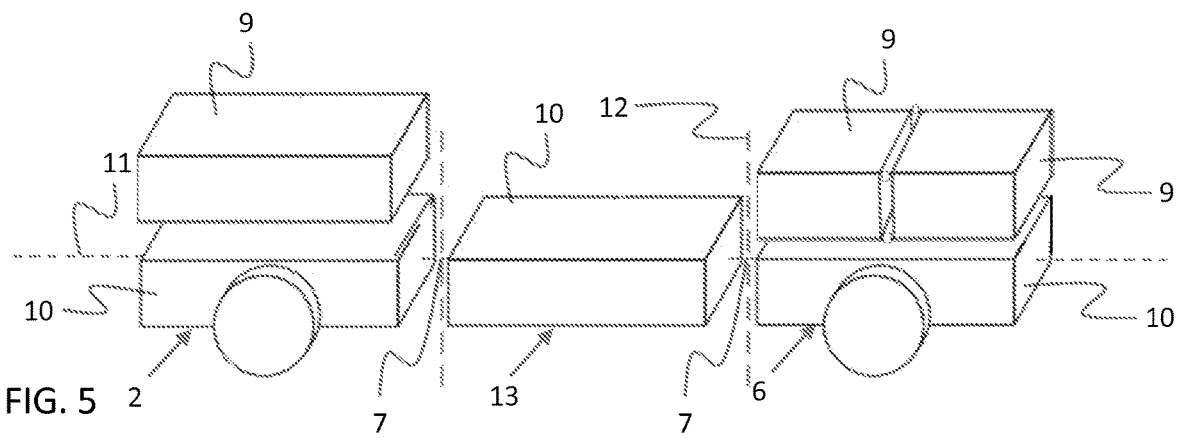
FIG. 5 shows a highly schematic view of a working machine with three bottom sections connected to each other with a frame pivot and three top sections.

In FIG. 5 is shown an embodiment intended for demonstrating multiple combination options for top and bottom sections 9 and 10. Hence, the vehicle or working machine may comprise a front section 2 and a rear section 6 between which can be fitted a middle section 13. The foregoing sections make up three bottom sections 10 for the assembly. As the number of these sections is three, such sections are connected to each other with a frame pivot 7 in such a way that at least one of these frame pivots comprises a joint with at least two degrees of freedom, allowing rotation of the inter-articulated front section 2 and middle section 13 or the middle section 13 and rear section 6 with respect to a rotation axis 11 substantially lengthwise of the vehicle or working machine, as well as with respect to a vertical axis 12 extending through the frame pivot. On top of what in the figure are two bottom sections 6 furthest to the right are provided one with one and the other with two top sections 9, which in a working machine embodiment can be for example a cab, a loader, or a cargo space as mentioned above, or the like equivalent payload.

Figure 6:
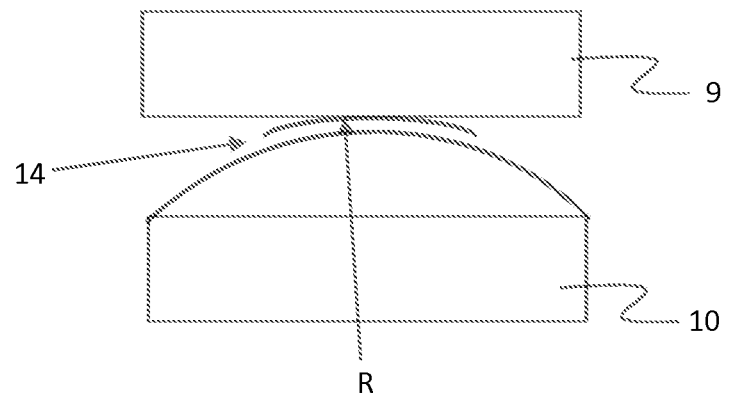
FIGS. 6-8 show in a highly schematic fashion the movement enabled by a motion path device for bottom and top sections relative to each other along a curvilinear path.
Figure 7:
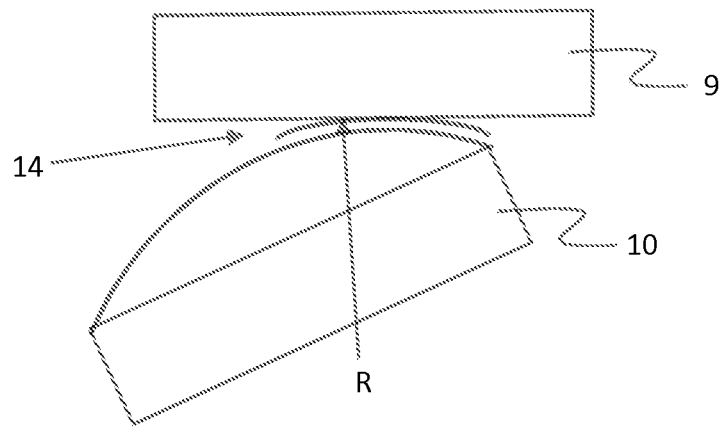

In the present assembly, the top sections 9, which are at least in a partially overlying position with respect to the working surface of a vehicle or working machine, are capable of being led to rotational motion relative to the bottom section 10 and a rotation axis 11 lengthwise of the vehicle or working machine. For this purpose, the top section and the bottom section are arranged to be movable relative to each other by way of at least one trajectory element 14 generating a curvilinear trajectory. Such a trajectory element is adapted to enable a movement of the top section 9 relative to the bottom section 10, such that the movement proceeds along a curvilinear trajectory, and wherein the curvilinear trajectory assumes, at least over part of its length, the shape of a circular arc. This trajectory lies on a section plane, which is substantially perpendicular relative to the vehicle's or working machine's longitudinal rotation axis. It is principally the size of the sections which dictates whether the number of these trajectory elements to be provided in the assembly is one or more. The relative movement between the sections is depicted schematically in FIGS. 6 to 8, wherein the trajectory element's trajectory is consistent with the drawing plane. Hence, the condition of FIG. 6 complies for example in forest machinery environment with the situation that the working machine is proceeding along even terrain, i.e. a flat working surface, or is stationary on a flat working surface. In the condition of FIG.

Figure 8:
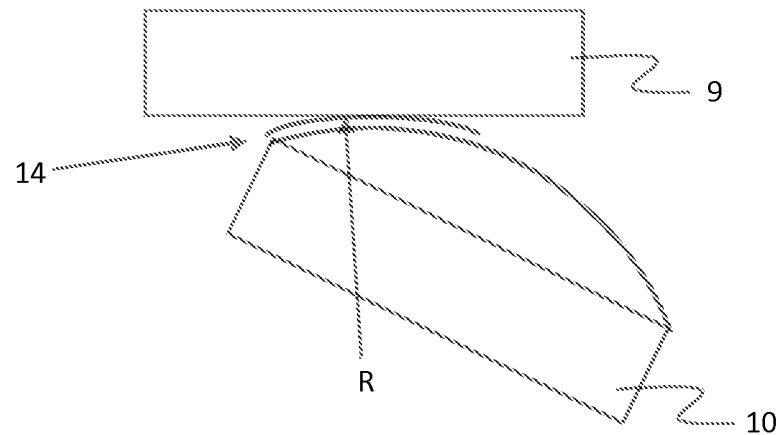
Figure 9:
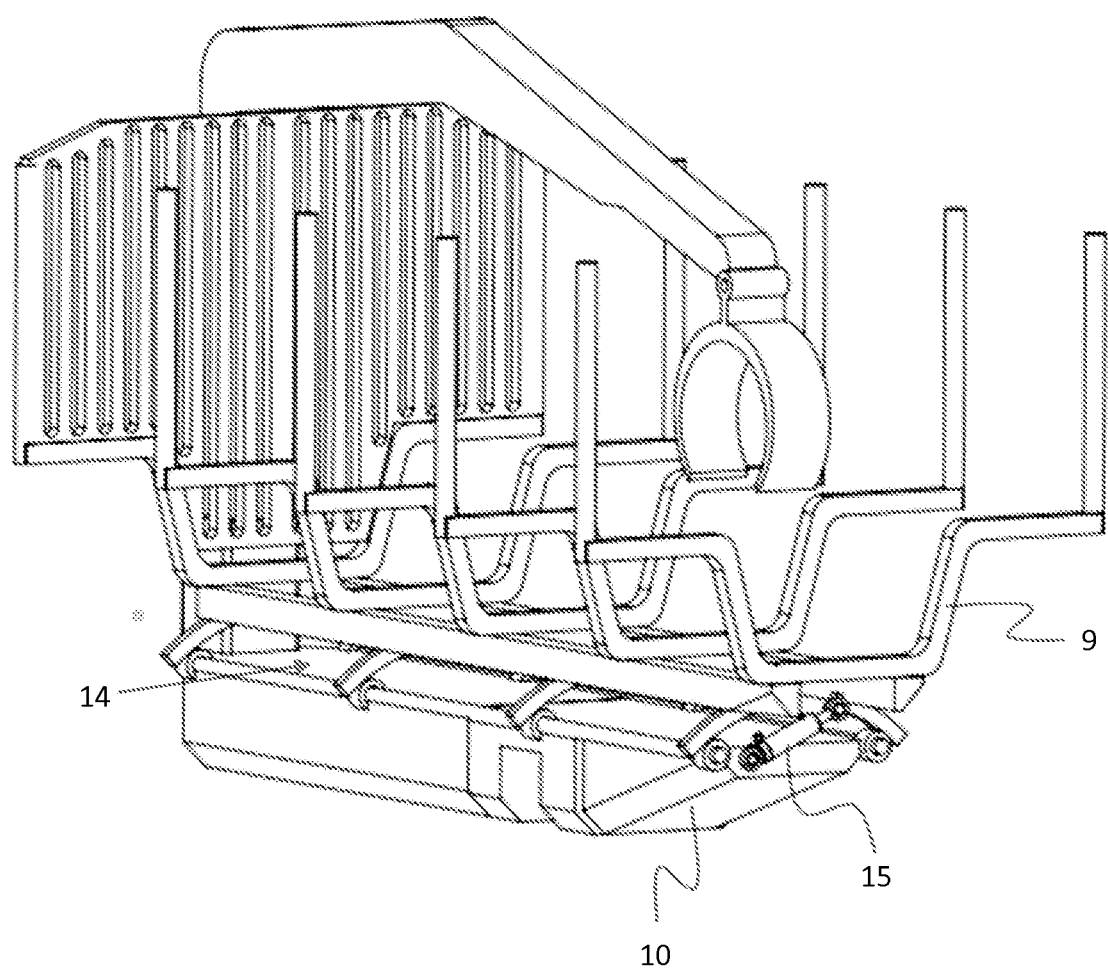
FIG. 9 shows a first embodiment for bottom and top sections connected to each other by a motion path device, in an axonometric view as seen obliquely from behind.
Figure 10:
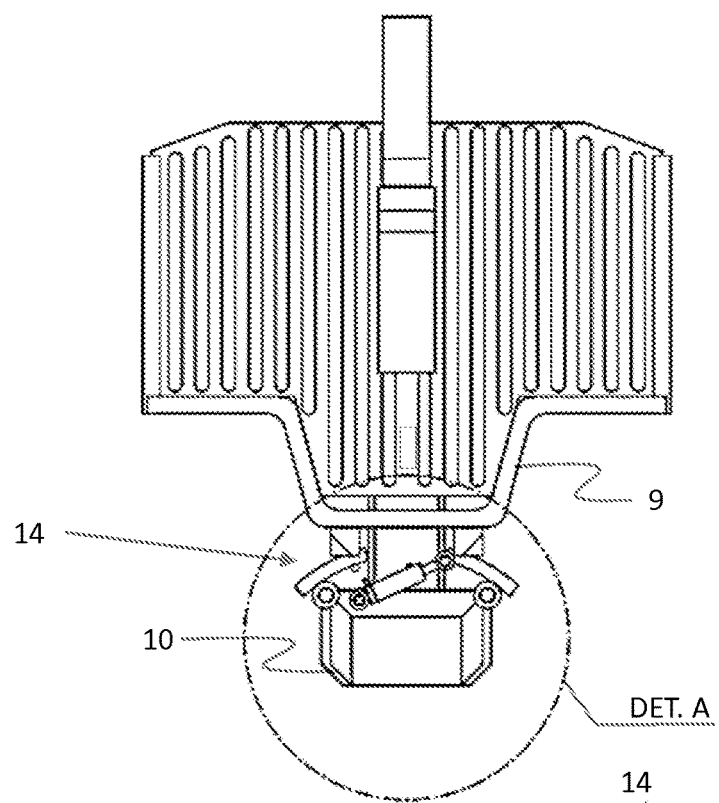
FIG. 10 shows the embodiment of FIG. 9 in a view from behind.

7, the right-hand side motion elements 5 of a working machine would be in the process of passing over an obstacle on the working surface (or the left-hand side motion elements have drifted into a depression on the working surface). In the condition of FIG. 8, respectively, the left-hand side motion elements of a working machine would be in the process of overcoming an obstacle on the working surface or the opposite side tires, those on the right-hand side, would be proceeding in a depression. Hence, the motion elements enable a movement of the top section 9 along a curvilinear, preferably circular arc-shaped trajectory in a perpendicular direction relative to the vehicle's longitudinal rotation axis.

FIGS. 9 to 18 illustrate two different embodiments for the assembly in relation to a forwarder of the forest machine 1. From these figures can also be distinguished at least one actuator 15, which achieves a movement between top and bottom sections 9 and 10 provided in the vehicle or working machine, and which has an impact on the top section and/or the bottom section. In such an embodiment, the actuator may—in order to achieve the movement—generate a push or pull motion. On the other hand, the actuator may also consist of a pinion, controlling by its rotating motion a rack provided in the trajectory element. The configuration and operation of the actuator do not as such make up an essential part of the present assembly. The force required by the actuator can be produced by using a pressure medium, i.e. hydraulically or pneumatically. The actuator working on a pressure medium is for example a hydraulic cylinder. The force required by the actuator can also be produced electrically by using for example an electric motor, such as a linear motor.

Figures 11, 12:
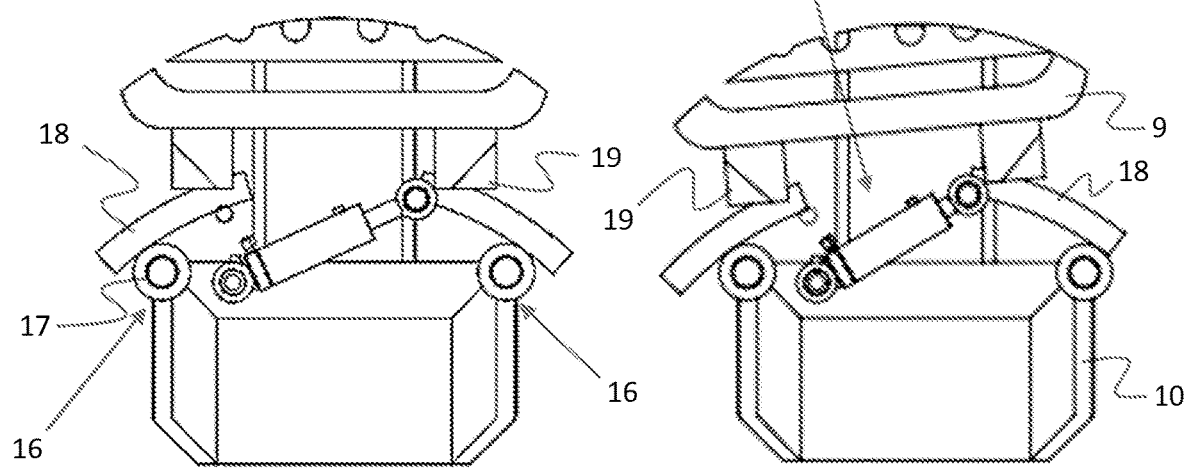
FIG. 11 shows a detail view of an item A in FIG. 10 from a first embodiment of the motion path device, the top section having been steered jointly above the bottom section to an upright position.
FIG. 12 shows a detail view of an item A in FIG. 10, the top section being in rotational motion counterclockwise relative to the bottom section.
Figure 13:
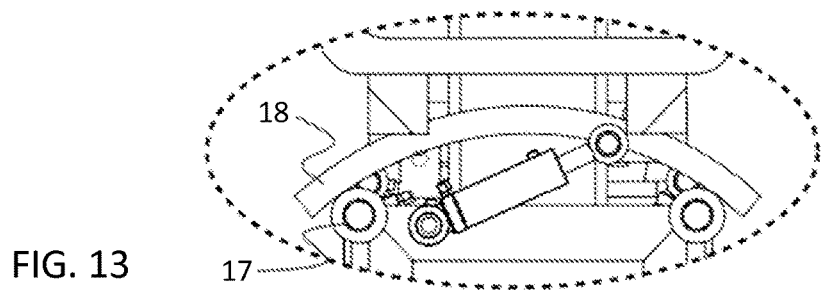
FIG. 13 shows a detail view of a second embodiment of the motion path device, the top section having been steered jointly above the bottom section to an upright position.
Figure 14:
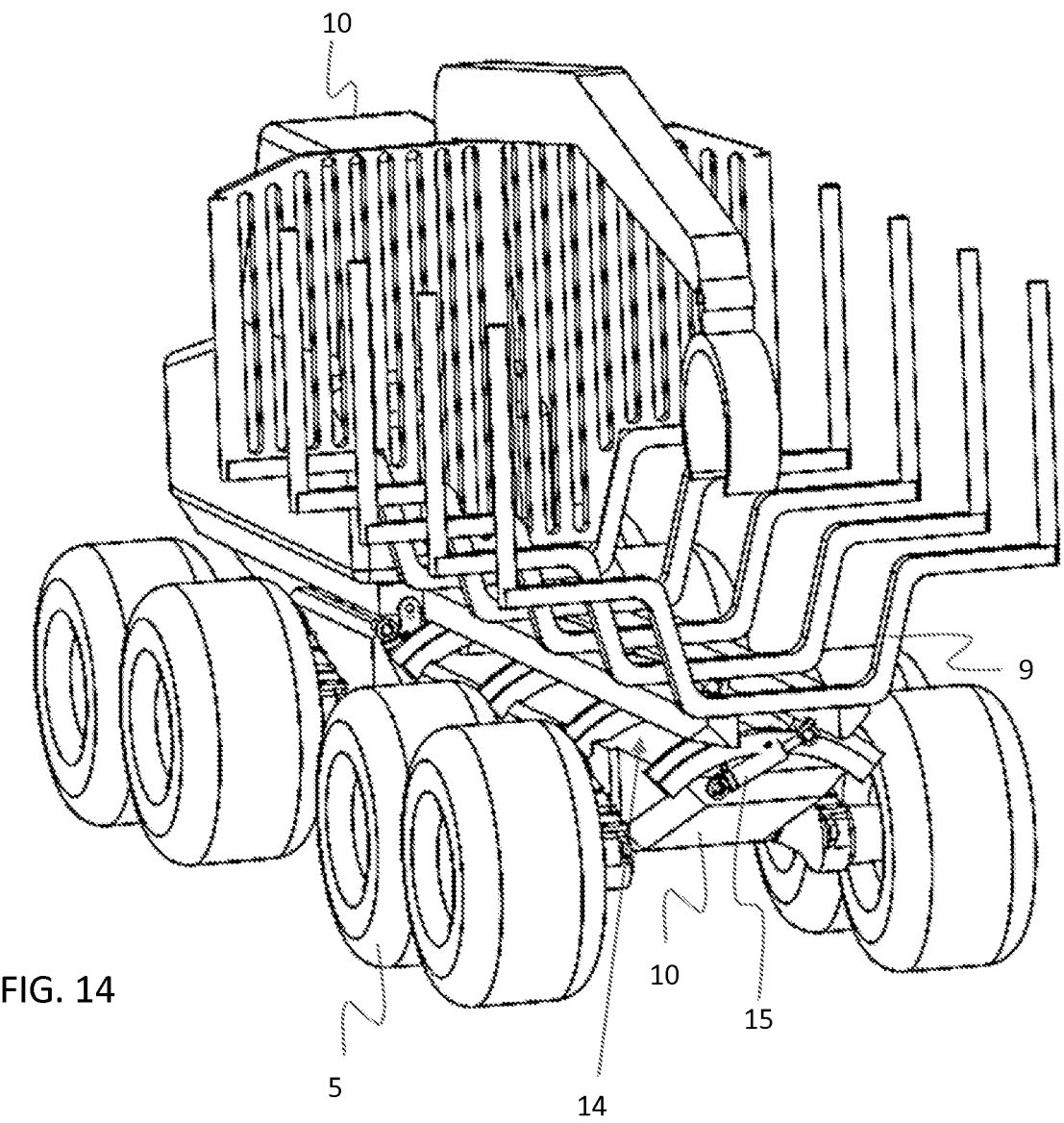
FIG. 14 shows a second embodiment for bottom and top sections connected to each other by a motion path device, in an axonometric view as seen obliquely from behind.
Figure 15:
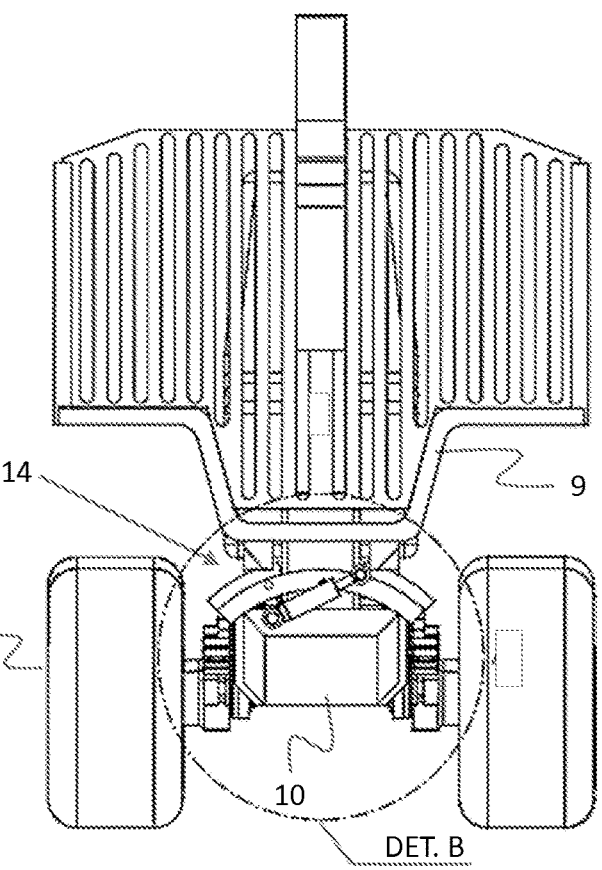
FIG. 15 shows the embodiment of FIG. 14 in a view from behind.

FIGS. 9 to 13 depict more accurately a first preferred embodiment for trajectory elements 14. Thus, the trajectory elements may comprise guide rollers 17 mounted on opposite outer edges 16 of the bottom section 10, which are co-directional with the vehicle's longitudinal rotation axis 11 and provided on both sides thereof. The guide rollers present on the same outer edge can have a common rotation axis or separate rotation axes, yet substantially parallel to the rotation axis 11. In order to achieve a relative rotation of the top and bottom sections 9 and 10, the guide rollers are in cooperation with a curved guide rail 18 fitted on the top section. This guide rail is in turn adapted to be in a substantially perpendicular position relative to the vehicle's longitudinal rotation axis 11. This curved guide rail may consist, as depicted in FIG. 13, of a continuous arc segment or, as depicted in FIGS. 11 to 12, of two arc segments fitted on opposite outer corners 19 of the top section 9, which are co-directional with the rotation axis and provided on either side thereof.

Figure 16:
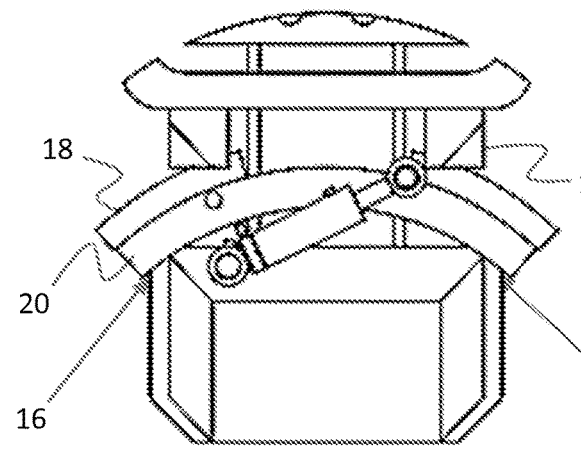
FIG. 16 shows a detail view of an item B in FIG. 15 from a third embodiment of the motion path device, the top section having been steered jointly above the bottom section to an upright position.
Figure 17:
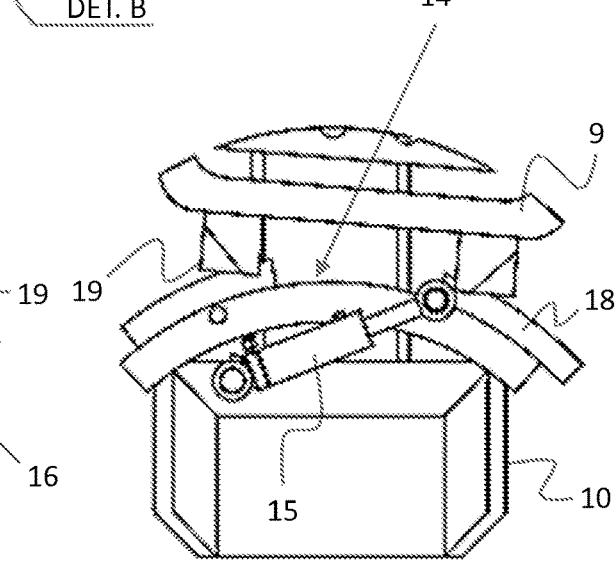
FIG. 17 shows a detail view of an item B in FIG. 14 from a third embodiment of the motion path device, the top section being in rotational motion clockwise relative to the bottom section.
Figure 18:
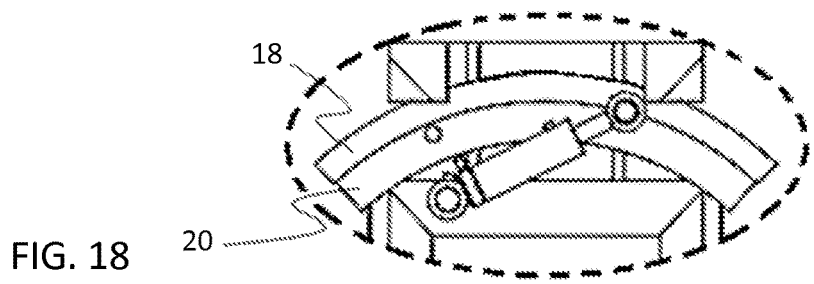
FIG. 18 shows a detail view of a fourth embodiment of the motion path device, the top section having been steered jointly above the bottom section to an upright position.

FIGS. 14 to 18, on the other hand, depict more accurately a second preferred embodiment for trajectory elements 14. In this case, the trajectory elements may comprise a slide guide rail 20 extending to opposite outer edges 16 of the bottom section 10, which are co-directional with the vehicle's longitudinal rotation axis 11 and provided on both sides thereof. This slide guide rail is in turn adapted to be in a substantially perpendicular position relative to the rotation axis 11 and it is in cooperation with a curved guide rail 18 fitted on the top section 9. This curved guide rail is also adapted to be in a substantially perpendicular position relative to the vehicle's longitudinal rotation axis. As in the preceding first embodiment, this curved guide rail may also consist, as shown in FIG. 18, of a continuous arc segment which, having been manufactured from a single piece, is simpler and more economical to produce. The arc segment can also be constructed, as shown in FIGS. 16 to 17, from two arc segments fitted on opposite outer corners 19 of the top section, which are co-directional with the rotation axis and provided on both sides thereof. Such an arrangement is structurally lighter while achieving space saving for other components.

The present assembly is also capable of being utilized in such a way that a support moment needed for stabilizing a vehicle's or working machine's bottom section 10 is determined by using the determination of a moment applied by the top section to the bottom section. Such a procedure provides a benefit of enabling an active stabilization adjustment according to the working status and prevailing conditions. In addition, the solution makes it possible that the control instruments used for managing the rotation of a vehicle's or working machine's various sections be employed for stabilizing the vehicle or working machine both when driving and being stationary.

For this purpose, the assembly may comprise measuring instruments 21 for determining a component of the moment applied by a top section to a bottom section, said component working essentially around a vehicle's or working machine's longitudinal rotation axis. The assembly further comprises determining instruments 22 for determining, on the basis of a moment applied by a top section to a bottom section, the magnitude and direction of at least one support moment needed for stabilizing at least the bottom section. On the basis of information obtained from the measuring instruments and the determining instruments, it is possible to use control elements 23 for managing at least one actuator for generating the calculated support moment.

The stability of a vehicle or working machine can be increased further by influencing the computational center of gravity of relative motion between the sections. By changing a radius of curvature R for the curvilinear trajectory formed by the trajectory elements, it is indeed possible to achieve a displacement for the location of a rotation axis defined by the trajectory elements. Thus, the radius of curvature is selectable in such a way that the rotation axis defined by the trajectory elements is located below an upper surface present in a suspension arrangement of motion elements provided in the bottom section. The trajectory's radius of curvature is even selectable in such a way that the rotation axis defined by the trajectory elements is located below a suspension arrangement of motion elements provided in the bottom section.

The present assembly for enabling rotational motion in a vehicle or mobile working machine operates as follows.

At least two sections provided in a vehicle or working machine are organized in an essentially overlying position with respect to the vehicle's or working machine's operating surface, therein constituting a top section 9 and a bottom section 10 for the vehicle or working machine.

These top section 9 and bottom section 10 in a superimposed position are led to rotating motion relative to each other and the vehicle's or working machine's main longitudinal rotation axis 11, whereby this motion has been brought about by arranging the top section and the bottom section to be movable relative to each other by means of at least one trajectory element 14 creating a curvilinear trajectory.

This trajectory element 14 enables a movement of the top section 9 with respect to the bottom section 10 in such a way that the movement proceeds along a curvilinear trajectory in one or more section planes which are perpendicular to the rotation axis. Indeed, the movement is achieved by means of at least one actuator 15 to be fitted on the vehicle or working machine and bearing on the top section and/or the bottom section. This aforesaid curvilinear trajectory extends around the longitudinal rotation axis of a vehicle or working machine, being convex towards the top section 9.

It is essential in the procedure that the top section 9, for example a working machine's cargo space, present above the bottom section 10, moves in lateral direction along a curvilinear, preferably substantially circular arc-shaped path. Said path is defined by a rotation axis 11, which is co-directional with the vehicle's or working machine's longitudinal axis and around which the motion proceeds. This rotation axis around which the top section, i.e. the superstructure or payload of a vehicle or working machine, is moving, has its location as low as possible. It can be regarded as a desirable objective that the rotation axis should be located below a suspension arrangement of the motion elements 5, for example a wheel bogie, close to the ground (the working surface).

The objective is attained in such a way that the trajectory elements 14 are constructed by fitting guide rollers 17 on opposite outer edges 16 of the bottom section 10, which are co-directional with the rotation axis 11 and provided on both sides thereof. For these guide rollers are selected rotating axes which are substantially parallel to the rotation axis. Moreover, the top section 9 is fitted with a curved, preferably circular arc-shaped guide rail 18 preferably perpendicularly to the rotation axis, said curved guide rail being in cooperation with the guide rollers. Thus, the actuator 15 provided in the assembly can be used for setting the top section in a motion which controllably brings about its rotating movement, whereby the guide rail 18 rotates relative to the rotation axis 11 under control of the guide rollers.

The solution according to the invention can naturally be also implemented in a manner compatible with the above-described features and embodiments by having the guide rollers 17 and the curved guide rails 18 installed in such a way that the rollers are located on the top section 9 and the curved guide rails on the bottom section 10.

It is also possible to construct the trajectory elements 14 a slide guide rail 20 extending to opposite outer edges 16 of the bottom section 10, which are co-directional with the rotation axis 11 and provided on both sides thereof, said slide guide rail being in a substantially perpendicular position relative to the rotation axis. The top section 9 is in turn fitted with a curved, preferably circular arc-shaped guide rail 18, which is in a substantially perpendicular position relative to the rotation axis and in cooperation with the slide guide rail. On the other hand, the curved guide rail is at least over a part of its length in the shape of a circular arc. In addition, the guide rail may vary in terms of its curvature and orientation. Preferably, the curvilinear trajectory is curving around the vehicle's lengthwise direction. It is now by an actuator provided in the assembly that the top section can be subjected to a movement that leads the same to rotating motion, whereby the guide rail rotates relative to the rotation axis under control of the slide guide rails.

Figure 19:
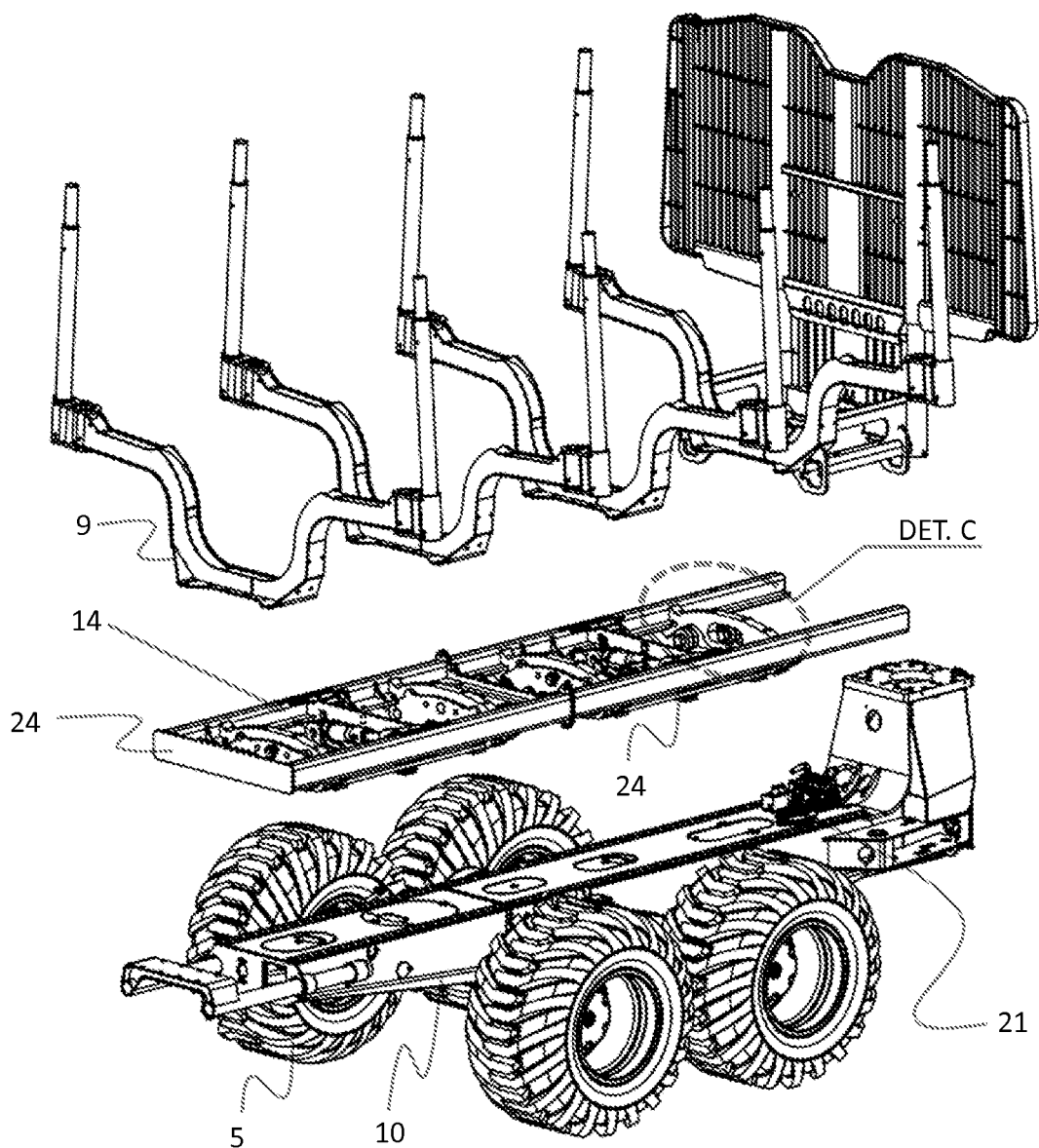
FIG. 19 shows one embodiment of a working machine's rear section, wherein a modular construction of the rear section is illustrated with an exploded view.

In FIG. 19 is depicted a special benefit attainable with the presently discussed embodiment, i.e. a possibility of constructing the vehicle or working machine in a modular fashion. As can be seen in the figure, between the vehicle or working machine can be fitted between its bottom section 10 and its top section 9 in a simple manner with trajectory elements 14. This way, for example a working machine stabilized in terms of its cargo space, or a conventional rear frame-equipped working machine with a fixed cargo space, can be manufactured by making use of the same basic structural parts. Stabilization of a working machine's payload, i.e. leveling, is achievable by installing between the working machine's bottom section and top section (cargo space) a specially designed stabilization module 24 which comprises the trajectory elements. Such stabilization modules can be installed in a vehicle or working machine in sufficient numbers, depending on loads to be carried and inertial forces applied thereto, or for example on the length of a forwarder's cargo space. The number of stabilization modules fitted on a short cargo space can be one or two as in FIG. 19 which has two stabilization modules. The number of stabilization modules fitted on a long cargo space can be for example from two to three. As shown in FIG. 19, the stabilization modules can have a substantially rigid connection to each other. At the same time, this serves to ensure the mutual synchronization of successive stabilization modules.

The stabilization modules 24 can be adapted to work independently, each including necessary measuring instruments 21, determining instruments 22, determining instruments 23 and actuators 15. Alternatively, the stabilization modules may use one or more of said instruments as a group, in which the instruments are shared by these particular stabilization modules. The solution provides a major benefit from the standpoint of industrial production by enabling the utilization of a structurally consistent working machine bottom section.

The solution is capable of being utilized regardless of whether the question is about stabilizing a top section 9 to be mounted on a front section 2, a middle section 13, or a rear section 6.

Figure 20:
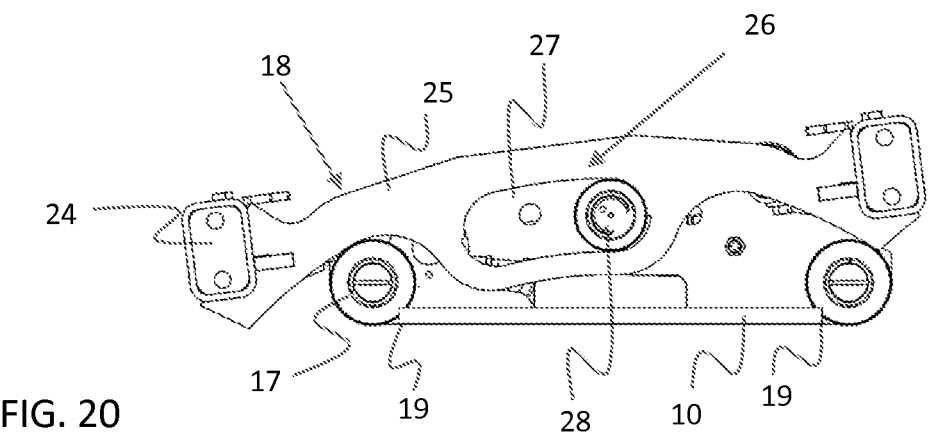
FIG. 20 shows a detail view of an item C in FIG. 19, which illustrates one preferred embodiment for the transfer device.

In FIG. 20 is shown one preferred embodiment for a trajectory element 14. Such a trajectory element comprises guide rollers 17 mounted on opposite outer edges 16 of the bottom section 10. In order to achieve a relative rotation between the top and bottom sections 9 and 10, the guide rollers are in cooperation with a control element 25 mounted on the top section and providing curved guide rails 18. These guide rails are fitted on opposite ends of the elongated control element to be in a substantially perpendicular position relative to the vehicle's longitudinal rotation axis 11. The control element is also provided with a specific retaining mechanism 26, wherein a middle roller 28, which is fitted in a guide slot 27 present in the control element and which protrudes therein from the bottom section, delimits a lateral movement of the control element and takes up, preferably together with the guide rollers, some of the load during rotating motion. The middle roller also leads the control element 25 to remain stationary and prevents a disengagement of the control element, and the top section 9 attached thereto, from the bottom section 10.

In terms of its operation, the present solution is indeed based on an endeavor to dampen the fluctuation of a vehicle's or working machine's payload in lateral direction with respect to the vehicle's or working machine's lengthwise direction by enabling a movement of the payload along a curvilinear trajectory by means of trajectory elements 14. Hence, the top section 9 or other payload is conducted towards a so-called normal position, in other words towards an upright position in relation to the Earth's gravity or a free-fall acceleration vector. It is an objective of the actuator to lead the top section, and a payload possibly mounted thereon, out of the inclined position towards a so-called leveled position. In this orientation, the acceleration vector of a top section's and a possible payload's center of mass would have a component mainly co-directional with the Earth's gravity. This enables sideways tilting of the top section to be opposed and/or dampened effectively.

The term payload is used in this context in reference to a physical body, which is involved in the working of a vehicle or working machine or comprised or handled by the vehicle's or working machine's top section 9. These may include a boom system and/or a load, or a vehicle/working machine or a part thereof. Some of the payload may consist for example of a boom system deflected from the lengthwise direction of a vehicle or working machine and/or a tool mounted thereon, such as a harvester head or a grapple. It can also be some other mass present on the boom system, such as a presently handled tree. The payload may also be formed by an engine or a cab mounted on the top section, or by a forwarder's load or by some other payload comparable therewith or by the inertia of such a mass.

As the actuator 15 is used for opposing or dampening the sideways tilting of a top section, the result will be a reduction of stresses on a vehicle's or mobile working machine's frame structures, terrain damages, the likelihood of a cargo space tipping over in forwarders, or, respectively, the likelihood of toppling in the case of other vehicles or working machines.

In embodiments of the present solution, the technical effect provided by a curvilinear path is that the curvilinear trajectory of a top section or a payload has its midpoint, around which at least some of the motion rotates, located below an upper surface of the bottom section, preferably completely below the bottom section, and even more preferably flush with or below the working surface.

Because the curvilinear trajectory is at least over a part of its length in the shape of a circular arc, the trajectory, or a guide rail establishing the same, may change in terms of its curvature. Thus, of course, with a change in the curvature there will be a change in the radius of the trajectory, as well as simultaneously in the location of the centre thereof. Hence, the curvature of a trajectory created by the trajectory element changes and, at the same time, the trajectory's centre changes according to an appropriate point on the trajectory. Accordingly, the centre of a trajectory can be determined to be located within a specific area as opposed to being located at a single point. In one particular preferred case, the trajectory has a curvature which is circular arc-shaped over the entire distance.

It is obvious for a skilled artisan that, with progressing technology, the basic notion of the foregoing solution can be implemented in a multitude of ways. Therefore, the presented solution and its embodiments shall not be limited to the foregoing examples but, instead, may vary within the scope of the claims.

The invention claimed is:

1. An assembly for enabling rotational motion in a vehicle or mobile working machine comprising:
    at least two sections arranged in at least a partially overlying position relative to a working surface of the vehicle or a working surface of the working machine, the at least two sections making up a top section and a bottom section, said top section and bottom section being coupled movably to each other by way of at least one trajectory element providing a curvilinear trajectory;
    the bottom section having at least motion elements for enabling a movement of the vehicle or working machine;
    the at least one trajectory element being configured to enable a motion of the top section with respect to the bottom section, the motion being arranged to proceed along the curvilinear trajectory and in a section plane which is in a perpendicular position relative to a substantially longitudinal rotation axis of the vehicle or working machine, wherein the curvilinear trajectory is at least over a part of its length in a shape of a circular arc with the trajectory extending around the vehicle's or working machine's longitudinal rotation axis;
    at least one actuator fitted on the vehicle or working machine and bearing on the top section and/or the bottom section for generating motion; and
    the bottom section being formed at least in part by a front section and a rear section, which are successive in lengthwise direction and connected to each other by a frame pivot with at least two degrees of freedom, said frame pivot being configured to allow a rotation of the front section and rear section with respect to the vehicle's or working machine's longitudinal rotation axis as well as with respect to a vertical axis extending through the frame pivot.

2. An assembly according to claim 1, wherein the at least one trajectory elements comprise:
    on one hand, a curved guide rail provided in the top section and fitted in a substantially perpendicular position relative to the rotation axis; and
    on another hand, guide rollers provided in the bottom section and fitted on opposite outer edges which are co-directional with the rotation axis and provided on both sides of the bottom section; such that:
    the guide rollers have a rotational axis which is substantially parallel to the rotation axis; and
    the guide rollers are in cooperation with the at least one curved guide rail.

3. An assembly according to claim 2, wherein the curved guide rail comprises:
    two guide rail segments fitted on opposite edges of the top section, which edges are co-directional with the rotation axis and provided on both sides thereof.

4. An assembly according to claim 2, wherein the curved guide rail comprises:
    a continuous curved guide rail segment.

5. An assembly according to claim 2, comprising:
    a control element on which the curved guide rail is mounted, whereby the curved guide rail is fitted on opposite ends of the elongated control element; and
    a retaining mechanism, having a guide slot configured to be fitted with a middle roller protruding from the bottom section for delimiting a lateral movement of the control element.

6. An assembly according to claim 1, wherein the at least one trajectory element comprises:
    a slide guide rail extending to opposite outer edges of the bottom section, which edges are co-directional with the rotation axis and provided on both sides thereof;
    the slide guide rail being configured to be in a substantially perpendicular position relative to the rotation axis; and
    the slide guide rail being arranged in cooperation with a curved guide rail fitted on the top section, said curved guide rail being configured to be in a substantially perpendicular position relative to the rotation axis.

7. An assembly according to claim 6, wherein the curved guide rail comprises:
    two curved guide rail segments parallel to the slide guide rail and fitted on opposite outer edges of the top section, which edges are co-directional with the rotation axis and provided on both sides thereof.

8. An assembly according to claim 6, wherein the curved guide rail comprises:
    a continuous guide rail segment parallel to the slide guide rail.

9. An assembly according to claim 1, wherein the at least one actuator is arranged to produce a push or pull motion.

10. An assembly according to claim 1, wherein the front section and/or the rear section constitute the bottom section.

11. An assembly according to claim 1, wherein the vehicle or working machine comprises:
- a plurality of frame pivots;
- at least three sections which include the front section, the rear section, and at least one middle section, connected to each other by a respective frame pivot of the plurality of frame pivots, whereby
- at least one frame pivot of the plurality of frame pivots includes a joint with at least two degrees of freedom, which allows the front section and middle section, the middle section and rear section, or two adjacent middle sections to rotate with respect to the vehicle's or working machine's substantially longitudinal rotation axis as well as with respect to a vertical axis extending through the frame pivot.

12. An assembly according to claim 11, wherein the front section and/or the at least one middle section and/or the rear section make up the bottom section.

13. An assembly according to claim 1, wherein the assembly comprises:
- measuring instruments for determining a component of a moment applied by the top section to the bottom section, said component prevailing around the vehicle's or working machine's substantially longitudinal rotation axis;
- determining instruments for determining a magnitude and direction of at least one support moment needed for stabilizing at least the bottom section, said determining being based on the moment applied by the top section to the bottom section to be supported;
- the at least one actuator includes at least one set of actuators for generating the at least one support moment; and
- control elements for controlling the at least one set of actuators so as to provide the at least one support moment.

14. An assembly according to claim 1, comprising:
- means for introducing a change in a radius of curvature of the curvilinear trajectory established by the at least one trajectory element to obtain a displacement in location of a rotation axis defined by the at least one trajectory element.

15. An assembly according to claim 14, wherein the radius of curvature for the curvilinear trajectory established by the at least one trajectory element is selected in such a way that the rotation axis defined by the at least one trajectory element will be located below a suspension arrangement for motion elements provided in the bottom section, so as to be flush with or below the working surface.

16. An assembly according to claim 1, wherein the bottom section and the top section are fitted to each other with the at least one trajectory element installed therebetween and arranged to make up a shared stabilization module.

17. An assembly according to claim 16, wherein the vehicle or working machine is configured to be fitted with one or more of the stabilization modules connected to each other in a substantially rigid manner.

18. A method for enabling rotation motion in a vehicle or mobile working machine, said vehicle or working machine having at least two sections, arranged in at least a partially overlying position relative to a working surface of the vehicle or a working surface of the working machine, the at least two sections making up a top section and a bottom section,
- said top section and bottom section being arranged to be movable relative to each other by way of at least one trajectory element providing a curvilinear trajectory, and
- the bottom section being configured with motion elements for enabling a movement of the vehicle or working machine, the method comprising:
- enabling via the at least one trajectory element, a motion of the top section with respect to the bottom section such that the motion proceeds along a curvilinear trajectory in a section plane which is in a perpendicular position relative to a substantially longitudinal rotation axis of the vehicle or working machine;
- arranging the curvilinear trajectory to be at least over a part of its length in a shape of a circular arc, this curvilinear trajectory having its centre set below the bottom section and said curvilinear trajectory extending around the vehicle's or working machine's longitudinal rotation axis; and
- generating the motion of the at least one trajectory element by at least one actuator to be fitted on the vehicle or working machine and bearing on the top section and/or the bottom section, wherein
the vehicle or working machine is constructed with the bottom section including, at least in part, a front section and a rear section, which are successive in lengthwise direction and connectible to each other by a frame pivot with at least two degrees of freedom such that the front section and rear section are rotatable with respect to each other relative to the vehicle's or working machine's longitudinal rotation axis as well as with respect to a vertical axis extending through the frame pivot.

19. A method according to claim 18, comprising:
- constructing the at least one trajectory element by fitting guide rollers on opposite outer edges of the bottom section, which edges are co-directional with the rotation axis and provided on both sides thereof, said rollers having rotational axes which are substantially parallel to the rotation axis; and
- fitting the top section with a curved guide rail which is substantially perpendicular relative to the rotation axis, said curved guide rail being in cooperation with the guide rollers such that the at least one actuator generates on the top section a movement that leads it to rotational motion, whereby the guide rail rotates with respect to the rotation axis under control of the guide rollers.

20. A method according to claim 18, comprising:
- constructing the at least one trajectory element by fitting a slide guide rail extending to opposite outer edges of the bottom section, which edges are co-directional with the rotation axis and provided on both sides thereof, said slide guide rail being substantially perpendicular relative to the rotation axis; and
- fitting the top section with a curved guide rail, which is substantially perpendicular relative to the rotation axis and in cooperation with the slide guide rail such that the at least one actuator generates on the top section a movement that leads to rotational motion, whereby the guide rail rotates with respect to the rotation axis under control of the slide guide rail.

21. A method according to claim 18, comprising:
a plurality of frame parts:
constructing the vehicle or working machine of at least three sections which include the front section, the rear section, and at least one middle section, connected to each other with respective frame pivots of the plurality of frame pivots, whereby
at least one of the plurality of frame pivots includes a joint with at least two degrees of freedom, which allows the front section and middle section, the middle section and rear section, or two adjacent middle sections to rotate with respect to the vehicle's or working machine's substantially longitudinal rotation axis as well as with respect to a vertical axis extending through the frame pivot, and
the front section and/or the middle section and/or the rear section make up the bottom section;
determining, via the measuring instruments, a component of a moment applied by the top section to the bottom section, said component working around the rotation axis which is substantially co-directional with the driving direction;
determining, via computational instruments, based on the moment applied by the top section to the bottom section, the magnitude and direction of at least one support moment needed for stabilizing at least the bottom section; and
controlling the at least one actuator by control elements for generating the at least one support moment.

* * * * *